April 22, 1958 C. R. WISCHMEYER 2,831,971

ELECTRONIC GATE CIRCUIT

Filed Feb. 15, 1954

INVENTOR.
Carl R. Wischmeyer,
BY Melvin J. Fincke
ATTORNEY.

United States Patent Office 2,831,971

Patented Apr. 22, 1958

2,831,971

ELECTRONIC GATE CIRCUIT

Carl R. Wischmeyer, Houston, Tex., assignor, by mesne assignments, to Esso Research and Engineering Company, Elizabeth, N. J., a corporation of Delaware Application February 15, 1954, Serial No. 410,093

3 Claims. (Cl. 250—27)

This invention relates to an electronic gating circuit and more particularly this invention relates to a simple and efficient circuit for accepting a gating voltage and a signal voltage at the input and obtaining at the output an amplified signal during the time interval allowed by the gating voltage but otherwise unaffected by the gating voltage.

For performing certain types of operations which involve electronic circuits, it is often desirable to have a means for cutting off the flow of an input signal during a certain time interval and for allowing the input signal to be indicated as an output signal during certain other time intervals. In practice, this is often accomplished by the provision of an electronic tube having a control grid through which an input signal is introduced into the circuit. The electronic tube also contains another grid such as a suppressor grid which, when a negative voltage is applied thereto, operates to prevent the flow of electrons from the cathode of said electronic tube to the anode thereof thereby discontinuing the flow of current to the output. Such a circuit is called an electronic gating circuit. However, a difficulty experienced in utilizing such electronic gating systems is that the gating voltage applied in order to stop the flow of electrons to the anode of the vacuum tube produces an amplified voltage in the output of opposed phase or opposite polarity to that of the gating voltage. The undesired amplified switching voltage appears in the output along with the desired amplified input signal. Electronic circuits have been devised for the purpose of limiting or cancelling out the gating voltage. However, previous circuits have required the use of a plurality of electronic tubes arranged so that the plate current of a second electron tube opposes during a certain interval of time the plate current of the electron tube receiving the input signal. These electronic circuits are complicated in structure.

It is an object, therefore, of this invention to provide a very simple electronic gating circuit capable of limiting or canceling out the gating voltage.

It is a further object of this inventon to prioride an electronic gating circuit which requires the use of only one electronic tube within the gating circuit itself.

Briefly described, my new electronic gating circuit consists of an electron tube having at least a control grid which receives an input signal and a suppressor grid for applying a gating voltage to the electron tube. Directly connected to the suppressor grid and also directly connected to the anode of the electronic tube, I provide a means for combining the gating voltage and the phase-opposed voltage produced at the anode as a result of the application of said gating voltage in such a manner as to cancel out the effect of the gating voltage. The means for cancelling out the gating voltage may consist of an impedance connected to the suppressor grid with said impedance being connected to a second impedance, said second impedance being directly connected to the plate anode of the electron tube. The magnitudes of the two impedances are chosen so that the drops in potential across these two impedances which are in opposed phase cancel one another.

Objects other than those set out above and features of this invention will become apparent from the following detailed description when taken together with the accompanying drawings.

Figure 1:
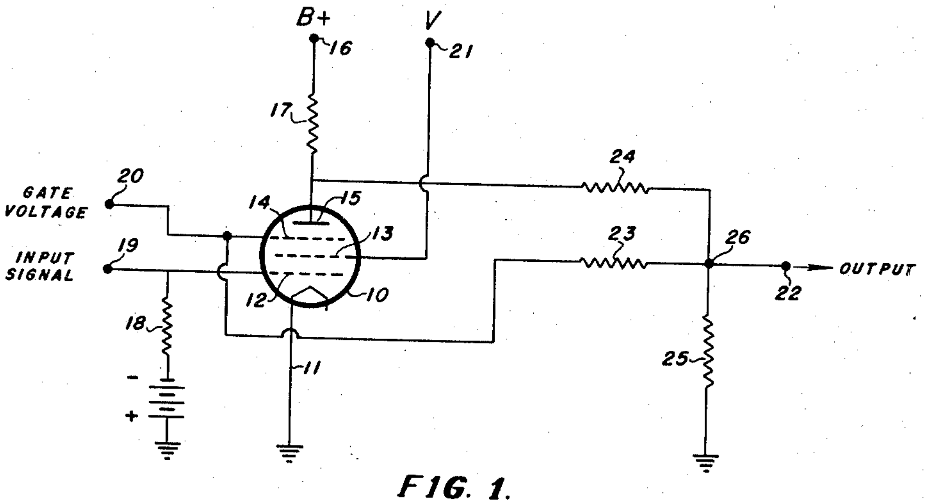
Fig. 1 is a schematic circuit diagram of an embodiment of my invention.

Referring more particularly to the drawings, the embodiment shown consists of a pentode tube 10 consisting of a cathode 11 which is ground, a control grid 12, a screen grid 13, a suppressor grid 14 and an anode 15. The plate or anode of the pentode tube is supplied with a voltage by means of a positive voltage source (B+) which is connected at terminal 16 and conducts current through resistor 17 to the plate 15. A negative bias such as a battery, as shown in the drawing, supplies negative voltage to the control grid 12 through resistor 18. The magnitude of the negative bias to control grid 12 is such that the tube will operate in the linear range of its plate current-grid voltage curve during the time interval the gate is "open." Also attached to the control grid is a means for conducting an input signal to said control grid from terminal 19. A gating voltage for "opening" or "closing" the gate for the purpose of letting through or cutting off the flow of electrons to the anode 15 from cathode 11 is supplied to the suppressor grid 14 through terminal 20. The voltage of the screen grid 13 is supplied through terminal 21. Any input signal received at the control grid 12 from terminal 19 will be amplified and indicated at the output 22 in reverse phase to the phase of the original input signal. When it is desired to cut off the input signal, a negative voltage is applied to suppressor grid 14 from terminal 20, said negative voltage being of sufficient magnitude to completely cut off the flow of electrons to the plate 15. The negative voltage so applied appears in amplified form and in opposite phase in the output 22.

In a great many operations involving gating circuits, it is highly desirable that the gating voltage does not appear in any form in the output. It is toward the elimination or canceling out of the gating voltage that the remaining part of my electronic gating circuit is directed. Directly connected to the suppressor grid 14 is a resistance means 23. One end of the resistance means 23 is positioned so as to receive the same applied voltage from terminal 20 as is applied to the suppressor grid 14. Resistance means 23 is connected at its other end to a second resistance means 24. Resistance means 24 is connected to the plate 15. A third resistance means 25 represents a load across which output appears.

The output of terminal 22 has an open circuit load thereon so that no current flows in the output. Hence, according to Kirchhoff's laws, $$(E_{15}-E_{22})G_{24}+(E_{14}-E_{22})G_{23}=E_{22}G_{25}$$

or $$E_{22}=E_{15}\left(\frac{G_{24}}{G_{24}+G_{23}+G_{25}}\right)+E_{14}\left(\frac{G_{23}}{G_{24}+G_{23}+G_{25}}\right) \quad (1)$$

where $E_{22}$=output voltage at terminal 22
$E_{15}$=voltage at plate 15
$E_{14}$=voltage at suppressor grid 14

$G_{23}$=admittance of resistance 23
$G_{24}$=admittance of resistance 24
$G_{25}$=admittance of resistance 25

From the Equation 1 it is apparent that because the plate voltage is in opposed phase or opposite polarity to the gating voltage, the values of resistances 24 and 23 can be chosen so as to cancel out the gating voltage.

In order to illustrate the operation of my new electronic gating circuit, assume that an original voltage of about 250 volts is applied at terminal 16. The current flowing through resistance means 17 will cause a certain voltage drop across resistance means 17 according to Ohm's law. When a negative gating voltage is applied to the suppressor grid 14 from terminal 20, the flow of electrons to the plate 15 will be cut off thereby decreasing the current through resistance means 17. This decrease in current through the resistance means 17 will result in a lower voltage drop across resistance means 17 thereby providing a higher voltage at the plate 15. Hence it can be seen that a more negative switching voltage produces a more positive plate voltage, i. e., the plate voltage is in opposed phase to the gating voltage. The gating voltage is conducted through resistance means 23 to junction 26. The opposed phase plate voltage is also conducted to junction 26 through resistance means 24. The resistance means 24 and 23 are such that the resultant effect of the gating voltage in the output voltage is nullified in accordance with Equation 1. The circuit including resistance means 23 and 24 will be recognized as the familiar adding circuit or resistive mixer utilized in many computer circuits.

Figure 2:
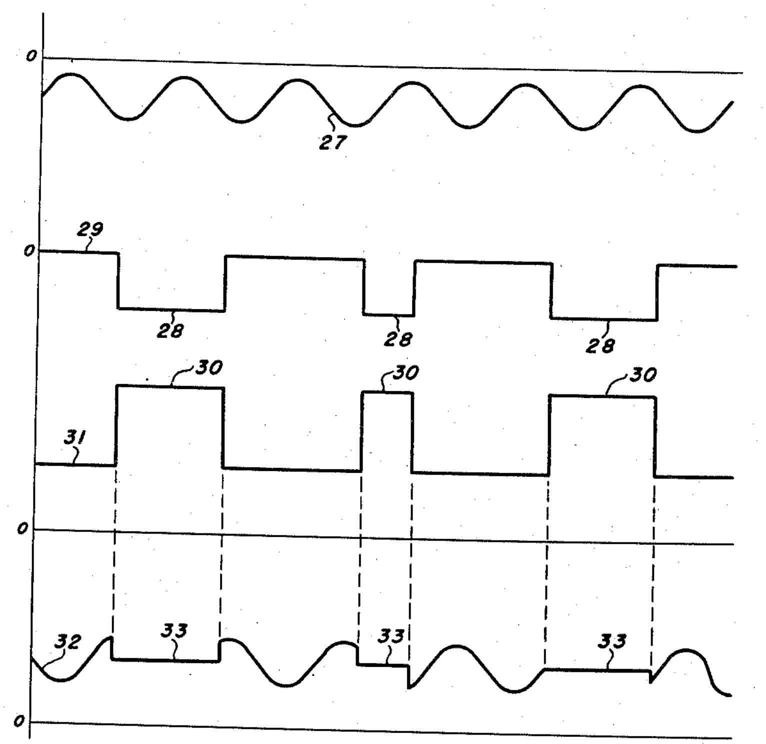
Fig. 2 shows in graphic form an input signal such as may be used in practicing my invention, the gating voltage, the plate voltage produced as a result of the application of said gating voltage and the output voltage received.

In Fig. 2, a graphical representation of the input signal, the gating voltage, the component of the plate voltage due to the gating voltage input and the resultant output voltage is shown. Assuming an input voltage of approximately sine wave form such as shown at 27, the negative gate voltage will produce excursions at 28 of curve 29. These excursions will appear in the plate in opposed phase such as shown at 30 in curve 31. By the proper selection of the magnitude of resistances 24 and 23 the resultant output voltage appears as a curve such as shown at 32. As can be seen by looking at curve 32, the excursions 28 and 30 have been canceled out and appear as straight lines 33 on curve 32 with the amplified input signal appearing in reverse phase.

It can be seen that my new invention provides a simple electronic gating circuit involving only one electron tube for canceling out the undesirable gating voltage. The circuit shown, of course, illustrates only one specific embodiment of this invention; the many possible modifications will be readily apparent to those skilled in the art. For example, the resistance means described may be attached to a transistor and the same effect will be obtained. Therefore, this invention is not to be limited except insofar as it is necessitated by the prior art and the spirit and scope of the appended claims.

I claim:

1. In an electronic gating circuit including an electron tube having a cathode, an anode, a control grid and a second grid, a first resistance means connected to said second grid, said first resistance means being connected to a second resistance means, said second resistance means being connected to said anode, third resistance means connected between said cathode and the juncture of said first and second resistance means; means for applying a gating voltage to said second grid thereby producing a phase-opposed voltage at said anode, said gating voltage being conducted through said first resistance means and said phase-opposed voltage being conducted through said second resistance means with said gating voltage and said phase-opposed voltage being combined at said connection of said first resistance means and said second resistance means so as to cancel each other across said third resistance means.

2. In an electronic gating circuit, a single electron tube, said electron tube having at least a cathode, a control grid, a screen grid, a suppressor grid and an anode, means for applying a signal to said control grid, means for applying a gating voltage to said suppressor grid thereby producing a phase-opposed voltage at said anode, a first resistance connected to said suppressor grid through which said gating voltage is conducted, a second resistance connected to said anode through which said phase-opposed voltage is conducted, said first resistance and said second resistance being joined together at the output of said electronic gating circuit, the value of said first resistance and the value of said second resistance being so chosen that the gating voltage and the phase-opposed voltage produced by said gating voltage cancel one another.

3. In an electronic gating circuit: electron tube means including at least a cathode electrode, a plate electrode, a control electrode, and a gating electrode; means for applying a gating pulse to said gating electrode; output impedance means; and adding circuit means coupling said gating electrode and said plate electrode to said output impedance operative to add said gating pulse to pulses of opposite polarity appearing at said plate to remove said pulses of opposite polarity from signals appearing across said output impedance.

References Cited in the file of this patent

UNITED STATES PATENTS

| | | |
|---|---|---|
| 2,092,496 | Branson | Sept. 7, 1937 |
| 2,459,181 | Rosen et al. | Jan. 18, 1949 |
| 2,499,604 | Neilson | Mar. 7, 1950 |
| 2,531,201 | De Lange | Nov. 21, 1950 |
| 2,583,146 | Jacob | Jan. 22, 1952 |